Nov. 14, 1967   T. THORNE-THOMSEN   3,352,576
TUBE COUPLING HAVING SPLIT RING LOCKING MEANS
Filed Aug. 24, 1965

INVENTOR.
THOMAS THORNE THOMSEN
BY
ATTORNEY

United States Patent Office 3,352,576
Patented Nov. 14, 1967

3,352,576
TUBE COUPLING HAVING SPLIT RING LOCKING MEANS
Thomas Thorne-Thomsen, Godfrey, Ill., assignor to Olin Mathieson Chemical Corporation, a corporation of Virginia
Filed Aug. 24, 1965, Ser. No. 482,045
6 Claims. (Cl. 285—169)

ABSTRACT OF THE DISCLOSURE

This invention is a quick-connect-coupling in which male and female members are provided, and in which the male member is inserted and locked without moving or rotating the female members. A shell member is contoured to hold a locking member in engagement with the male and female member to hold the coupling together.

This invention relates in general to coupling devices, and more particularly to a quick-connect and disconnect coupling for portions of hoses and the like.

By the instant invention there is provided a coupling which may be quickly connected or disconnected without the turning of threaded members, as is common in the prior art. The coupling of this invention comprises interfitting male and female members with a novel locking means, the means being such that the two members become automatically locked together by a snap action merely upon introduction of the male member into the female member. Separation of the two members is equally expeditious by a simple operation performed on one of the two members while pulling them apart.

The above-noted advantages are obtained by providing, in general, a male member having a groove in the outer periphery thereof, a female member formed to fit about said male member, said female member having slots in the outer periphery thereof in juxtaposition to said groove, a shell member mounted on said female member and including a restricted portion, and a locking member mounted upon said female member and within said shell member, said locking member having teeth thereon projecting through said slots and into said groove and held in such a position by said restricted portion.

It is accordingly an object of this invention to provide a coupling device of simple construction and low cost which obviates the disadvantages of the prior art devices.

It is a further object of this invention to provide such a coupling device which may be quickly connected and disconnected.

It is a still further object of this invention to provide a coupling device of the construction noted above.

Other objects and advantages will become apparent to those skilled in the art as a detailed description of a particular embodiment proceeds with reference to the drawings which form a part hereof, and in which.

Figure 1:
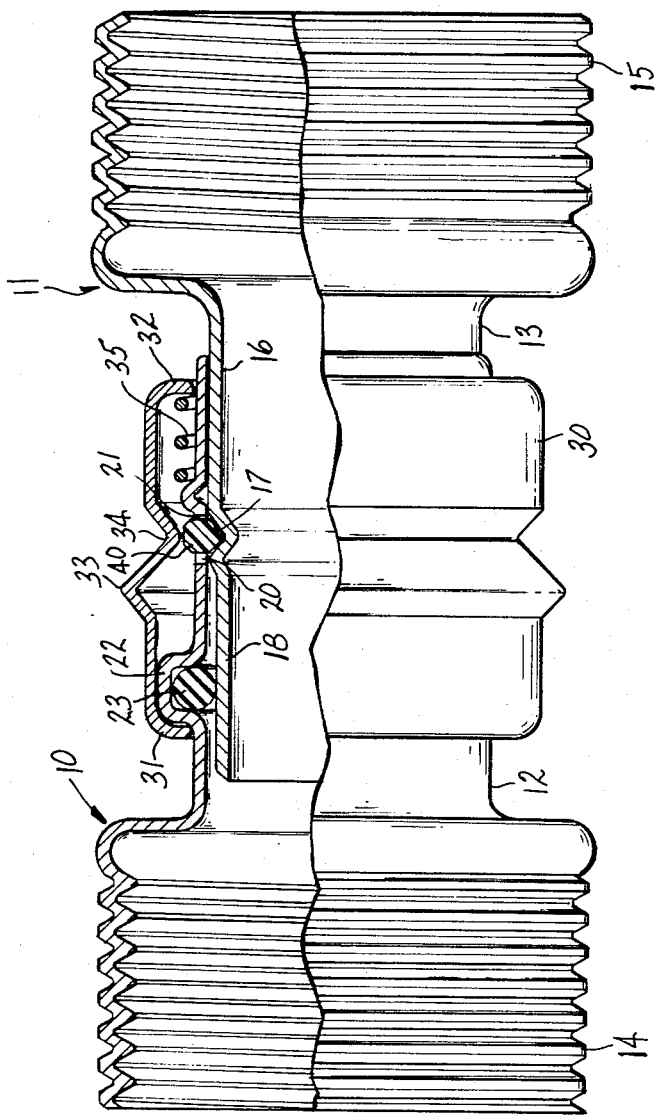
FIGURE 1 is an elevation of the instant coupling showing the two members thereof in joined relationship, a portion of the figure being shown in cross-section to illustrate the interior details.

Referring now to FIGURE 1 of the drawings, the coupling of the instant invention comprises a female member 10 and a male member 11. An end 12 of the female member 10 and an end 13 of the male member 11 are so formed as to be in interfitting relationship, as will be explained in detail hereafter. The other end 14 of the female member 10 and the other end 15 of the male member 11 include fittings adapted for connection to any desired conduit. In the form illustrated, fittings 14 and 15 comprise threaded members, to which hoses or the like may be connected by complimentary threaded members. The interior of the instant coupling device being hollow, as will become evident shortly, fluid flow may therefore take place, for example, from a hose or the like connected at the end 14, through the coupling, thence through the end 15 and into a hose or the like connected thereto. This use, however, is merely exemplary, and the instant coupling may be employed wherever a quick-connect and disconnect assembly is desired between two parts. For example by suitable modification the instant coupling may be employed for joining electrical transmission members, the male and female members of the electrical connector being securely mounted within the two members of the instant coupling.

Considering now the details of construction of the two parts, it will be seen that the end 13 of the male part 11 comprises a tubular portion 16 having a groove 17 entirely around the outer periphery thereof. A forward portion 18 of the end 13 may be of a lesser diameter than the portion 16, for reasons to become evident. The end 12 of the female member 10 is of a configuration to closely receive the end 13 of the male member 11, and includes in the periphery thereof a plurality of slots, one of which is shown at 20, at a position in juxtaposition to the groove 17 of the male member 15. The forward end 12 further includes an enlarged shoulder 21 for reasons to become evident, and an enlarged pocket portion 22. Within the pocket portion 22 may be included any suitable sealing means 23, such as an angular, resilient O-ring. It will be apparent that the sealing means 23 insures that the coupling is sealed against liquids and the like flowing through the male and female members in their assembled relationship.

Mounted upon the female member 10 is a tubular shell member 30. The shell member 30 may include at its opposite ends inturned portions 31 and 32, and intermediate the ends a restricted portion 34 and one or more enlarged portions 33. The inturned portions 31 and 32 are provided to allow for sliding motion of the shell member 30, the enlarged portion 33 aids in grasping the shell member to force it to slide, and the restricted portion 34 serves a locking function.

Considering first the sliding action of the shell member 30, the end 31 thereof may abut the pocket portion 22, thus preventing motion of the sleeve member 30 in a direction to the right in FIGURE 1. The end 32 cooperates with a helical spring 35 located within the shell member 30 and held between the end 32 and the shoulder 21 of the female member 14. It will be evident that in the relationship described, the shell member 30 is free to be moved in a direction to the left in FIGURE 1, thereby compressing the spring 35 against the shoulder 21. Upon releasing the shell member 30, the spring 35 would expand, returning the shell member 30 to the position shown.

Figure 2:
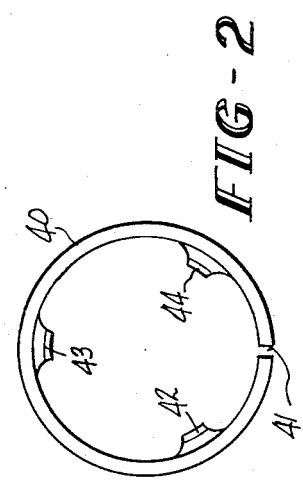
FIGURE 2 is an elevation of the locking member employed in the coupling illustrated in FIGURE 1.

Considering next the locking function of the construction described above, reference is first had to FIGURE 2, wherein is illustrated a locking member 40. The locking member 40 may comprise an annular ring which is split, as at 41, to provide for resiliency in expanding. Extending inwardly from the ring 40 are a plurality of tapered teeth such as 42, 43 and 44, the cross-section of each of which is best illustrated in FIGURE 1, wherein it will be seen that the teeth are of a configuration matching that of the groove 17. Referring again to FIGURE 1, it will be seen that the locking ring 40 surrounds the end 12 of female member 10, with the teeth 42, 43 and 44 projecting through the slots 20 and into the groove 17. With the male and female members in the locked relationship shown, the restricted portion 34 of shell member 30 prevents the locking member 40 from moving out of the slots 20, and accordingly prevents the male member 11 from separating from female member 10.

When it is desired to separate the two members, the shell member 30 is moved to the left as shown in FIGURE 1, against the biasing force of the spring 35. The restricted portion 34 being moved away from the position shown in FIGURE 1, the locking member 40 is free to expand outwardly into the space between the slots 20 and the shell member 30, thus withdrawing the teeth 42, 43 and 44 from the groove 17. The locking member 40 is forced to expand by exerting a force on the male member 11 to the right. The tapering configuration of the groove 17 cams the locking member 40 upwardly and out of engagement with the groove 17. Upon separation of the two members the locking member 40 is free to return to its unexpanded position, with the teeth 42, 43 and 44 within slots 20.

Accordingly, when it is desired to join the two members, the locking member 40 will be in position illustrated in FIGURE 1. As the male member 11 is introduced, the portion 18 and the shoulder formed between the portion 18 and the portion 16 will serve to expand and cam the locking member 40 upwardly into the space to the left of the restricted portion 34. The slots 20 are large enough to allow this motion and the tapering configuration of the restricted portion guides the locking member 40 in the desired direction. When the male member is in place, the locking member is free to return to its unexpanded position with teeth 42, 43 and 44 within the groove 17, where they are held in place by restricted portion 34. Thus, the joining of the members takes place automatically upon insertion of the male member into the female member in a simple manner and without reference to turning any threaded members as is common in the prior art. Furthermore, the shell member 30 need not be operated upon in the joining; this member is operated upon only in separating the two members.

From the above construction, it is evident that a new and novel coupling is provided. The coupling may be produced from any desired material, and in any desired manner. However, it has been found that sheet brass is particularly advantageous in the production of this device. Such material results in a durable coupling which is still adapted to be produced at low cost. All parts of the instant coupling may be of sheet brass, other than the spring 35, the sealing means 23, and the locking member 40. A locking member of plastic has been found to be particularly advantageous.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A quick-connect and dis-connect coupling device comprising
   (A) a male member having a groove in the outer periphery thereof,
   (B) a female member formed to fit about said male member, said female member having at least one slot in the outer periphery thereof in juxtaposition to said groove,
   (C) a shell member mounted on said female member and including a restricted portion in juxtaposition to said groove, said restricted portion having a tapered wall,
   (D) a locking member mounted upon said female member and within said shell member, said locking member being made of resilient material and comprising a split ring having at least one tooth thereon projecting through said slot and into said groove and being held in place by said restricted portion,
   (E) means biasing said shell member toward a position where said restricted portion is in juxtaposition to said locking member, thereby preventing separation of said male and female member until said restricted portion is moved out of juxtaposition to said locking member whereby said tooth may be withdrawn from said groove, the axial width of said slot being greater than the thickness of said tooth whereby during assembly said male member engages said tooth and moves said split ring axially away from said restricted portion and then expands said split ring said tapered wall of the restricted portion guiding said split ring into locking position without movement of said shell member.

2. A device according to claim 1 wherein said locking member contains a plurality of teeth and said female member contains a plurality of slots.

3. A device according to claim 2 wherein said shell member is biased by means of a spring.

4. A quick-connect and dis-connect coupling device, comprising
   (A) a tubular male member,
      (1) one end of said male member having a fitting for connection to a first portion of a hose,
      (2) the other end of said male member having a circular groove in the outer periphery thereof,
   (B) a tubular female member receiving in one end thereof said other end of said male member, said female member having at least one slot in the outer periphery of said one end in juxtaposition to said groove, the other end of said female member having a fitting for connection to a second portion of a hose,
   (C) a tubular shell member slidably mounted on said female member and including
      (1) a restricted annular portion on the periphery thereof, said restricted portion having a tapered wall,
      (2) means biasing said shell member to a position where said restricted portion is in juxtaposition to said slots, said shell member being slidable to a position where said restricted portion is out of juxtaposition to said slots,
   (D) a resilient split locking ring within said shell member, said ring having at least one tooth, projecting into one said slot and into said groove whereby said tooth is held within said groove when said restricted portion is in juxtaposition to said slot, thus, preventing separation of said male member and said female member, the axial width of said slot being greater than the thickness of said tooth whereby durind assembly said male member engages said tooth and moves said split ring axially away from said restricted portion and then expands said split ring, said tapered wall of the restricted portion guiding said split ring into locking position without movement of said shell member.

5. A device according to claim 4 wherein said other end of said male member and said other end of said female member each comprises a threaded fitting.

6. A device according to claim 4 wherein said locking ring comprises a plurality of teeth and said female member contains a plurality of slots.

References Cited

UNITED STATES PATENTS

| | | | |
|---|---|---|---|
| 1,509,651 | 9/1924 | Iftiger | 285—315 |
| 2,490,363 | 12/1949 | Lang | 285—315 |
| 2,503,495 | 4/1950 | Koester | 285—277 X |
| 2,744,770 | 5/1956 | Davidson et al. | 285—316 |
| 2,950,132 | 8/1960 | Kocsuta | 285—321 X |

CARL W. TOMLIN, *Primary Examiner.*

THOMAS F. CALLAGHAN, *Examiner.*

UNITED STATES PATENT OFFICE
CERTIFICATE OF CORRECTION

Patent No. 3,352,576                           November 14, 1967

Thomas Thorne-Thomsen

It is hereby certified that error appears in the above numbered patent requiring correction and that the said Letters Patent should read as corrected below.

Column 2, line 30, for "angular" read -- annular --.

Signed and sealed this 26th day of November 1968.

(SEAL)
Attest:

Edward M. Fletcher, Jr.                          EDWARD J. BRENNER
Attesting Officer                               Commissioner of Patents